C. H. CHANDLER.
MODE OF FORMING SCREWS.
No. 44,074. Patented Sept. 6, 1864.
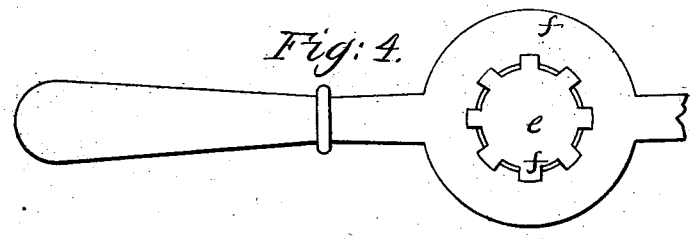
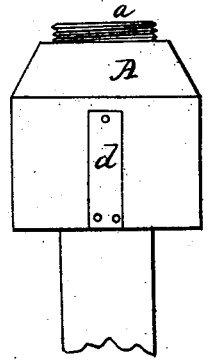 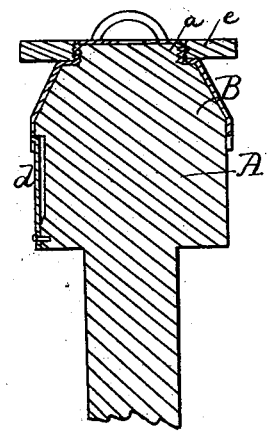 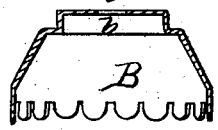
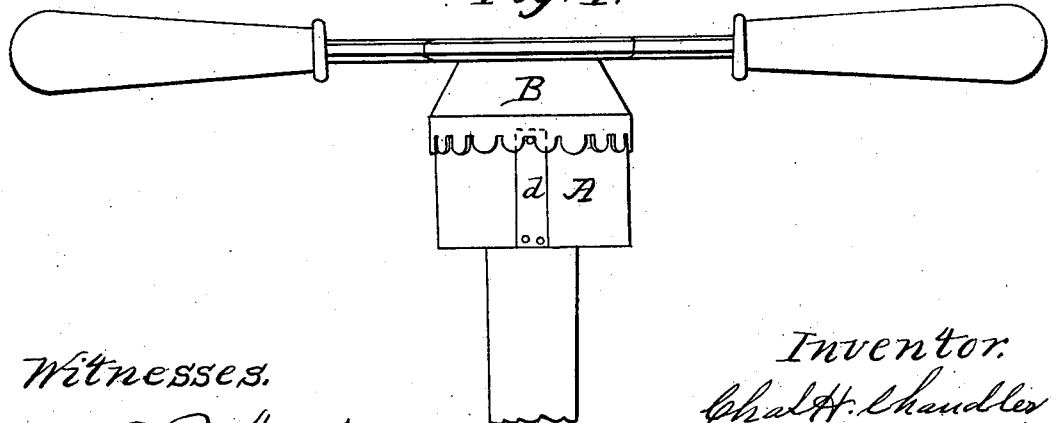

UNITED STATES PATENT OFFICE.

CHAS. H. CHANDLER, OF FOXCROFT, MAINE.

IMPROVED MODE OF FORMING SCREWS.

Specification forming part of Letters Patent No. 44,074, dated September 6, 1864.

*To all whom it may concern:*

Be it known that I, CHARLES H. CHANDLER, of Foxcroft, in the county of Piscataquis and State of Maine, have made a new and useful invention having reference to the Formation of Screws on Thin Tubes or Hollow Cylinders of Metal; and I do hereby declare the same to be fully described in the following specification and represented in the accompanying drawings, of which—

Figure 1 denotes a side view, and Fig. 2 a longitudinal section, of the base of a lamp-cap and the mechanism employed by me in carrying out my invention. Fig. 3 is a side view of the rotary mandrel and its forming-screw; and Fig. 4 is a side view of the screw-cutting die, to be hereinafter described.

The base part of a lamp-cap as now generally constructed is formed of thin plate-metal "struck up" or punched into shape by means of dies.

Heretofore it has been customary to cut the screw on the neck of the base by means of a chaser or a common screw-plate or cutting-die, in which case, for the formation of a complete screw-thread, the metal had to be thicker than the depth of the screw-thread.

In the formation of screws on their hollow cylinders or tubes of metal it has also been customary to employ a rotary mandrel and a forming-screw made at one end of the mandrel. In this case the tube has been placed on the screw so as to encompass it, and with the mandrel in revolution the metal has been pressed into the grooves between the thread of the screw. In this manner thin metal caps for bottles and various other articles have had female screws formed within them. The male screw, however, which would be on the outer surface of the article, would have its thread wider than the groove between any two next adjacent threads, and therefore could not be used to advantage as a screw.

In carrying out my invention I make use, in connection with the rotary mandrel and its forming-screw, of a device or instrument which shall not only operate to press the metal into the grooves of the forming-screw, but at the same time cut away and reduce the metal on its external surface in a manner to make the screw-thread and its groove of the proper widths or sizes for being screwed into a nut or female screw.

In the drawings, A denotes the rotary mandrel as made with a forming-screw, $a$, arranged at one end of it, the mandrel being properly shaped in other respects for receiving and holding the base part B of a lamp-cap, which is to be placed on the mandrel in manner as shown in the drawings, it having at the time of being applied to the mandrel the shape as represented in Fig. 5, on which the neck $b$ is shown as cylindrical and without any screw formed in it, the internal diameter of the neck being equal to the diameter of the forming-screw of the mandrel.

A spring-dog, $d$, or other suitable device may be applied to the mandrel and for the purpose of causing the base part B to rotate thereon with the mandrel while the latter may be in revolution. After the base part B may have been so applied to the mandrel, they are to be put in revolution, and while in revolution a cutting die or plate such as is generally used for cutting male screws on a round piece of metal (such die or plate being represented in Figs. 1, 2, and 4) is to be brought up to the neck $b$ and borne against, so as to cause the neck to enter the opening $e$ of the die. Next the die should be pressed against the neck in the direction of the axis of the mandrel and so as to cause the cutting parts $ff$ of the die not only to press the metal into the screw-groove of the forming-screw $a$, but at the same time to cut into the metal in a manner to form a screw or screw-thread on its outer surface.

After the screw may have been made on the neck $a$, such neck will be found to be so fixed on the forming-screw $a$ and within the cutting-die as to require for the separation of the three that the die should be unscrewed from the neck and the latter from the forming-screw. Thus by the combined operations of the forming-screw and the cutting-die carried on with respect to the base part of the lamp-cap in manner as explained I form in the neck of such base part a screw, which will be made both by bending the metal and by cutting it away between its bends.

By my process and means of making a screw on a tube or thin hollow cylinder the base part of the lamp-cap may be manufactured of much thinner metal than when the screw is to be formed wholly by cutting it by a chaser or its equivalent.

I do not claim making screws by pressing the metal into a forming-screw; nor do I claim making screws by means of a die-plate, as described, or its equivalent, when these two methods of making a screw are separately considered; but

I claim—

For the formation of screws as set forth, the combination of the rotary mandrel A, provided with a screw, $a$, as described, with a die-plate, said mandrel and die-plate being used substantially as specified.

CHARLES H. CHANDLER.

Witnesses:
E. J. HALE,
GILBERT CHANDLER.